United States Patent [19]

Hanssen et al.

[11] Patent Number: 4,458,771
[45] Date of Patent: Jul. 10, 1984

[54] CORNER POST MOUNT FOR WEIGHING SCALE

[75] Inventors: Stan B. Hanssen, Las Cruces, N. Mex.; Padraic Neary, Tubbercurry, Ireland

[73] Assignee: Tricolor Corporation, Las Cruces, N. Mex.

[21] Appl. No.: 420,403

[22] Filed: Sep. 20, 1982

[51] Int. Cl.³ .............................................. G01G 21/08
[52] U.S. Cl. .............................. 177/256; 177/DIG. 9
[58] Field of Search ................. 177/256, 257, DIG. 9; 308/6 R

[56] References Cited

U.S. PATENT DOCUMENTS 3,193,034  7/1965  Hutchinson et al. ........... 177/256 X
3,666,031  5/1972  Provi et al. ..................... 177/256 X Primary Examiner—George H. Miller, Jr.
Attorney, Agent, or Firm—Wood, Dalton, Phillips, Mason & Rowe

[57] ABSTRACT

An improved corner post mount for pivoting the levers of a platform-type scale. An upright member is molded integrally with the base at each corner thereof, and defines an upwardly facing opening to receive a flat insert. The upright has spaced tapered ledges which seat the edges of the insert that converge toward the bottom of the insert. The body of the insert is captured between a flat surface defined on the upright, which seats flushly against the insert, and an upright edge defined by a rib formed integrally with the base. The body of the insert has an extension which closely surrounds the upper edge of the upright. Preferably, an upwardly facing notch receives the extension. The insert, which is preferably metal, is implanted within the opening of the upright and frictionally kept captive within the base, which is preferably fabricated from a lightweight material, such as ABS plastic, or the like.

10 Claims, 7 Drawing Figures

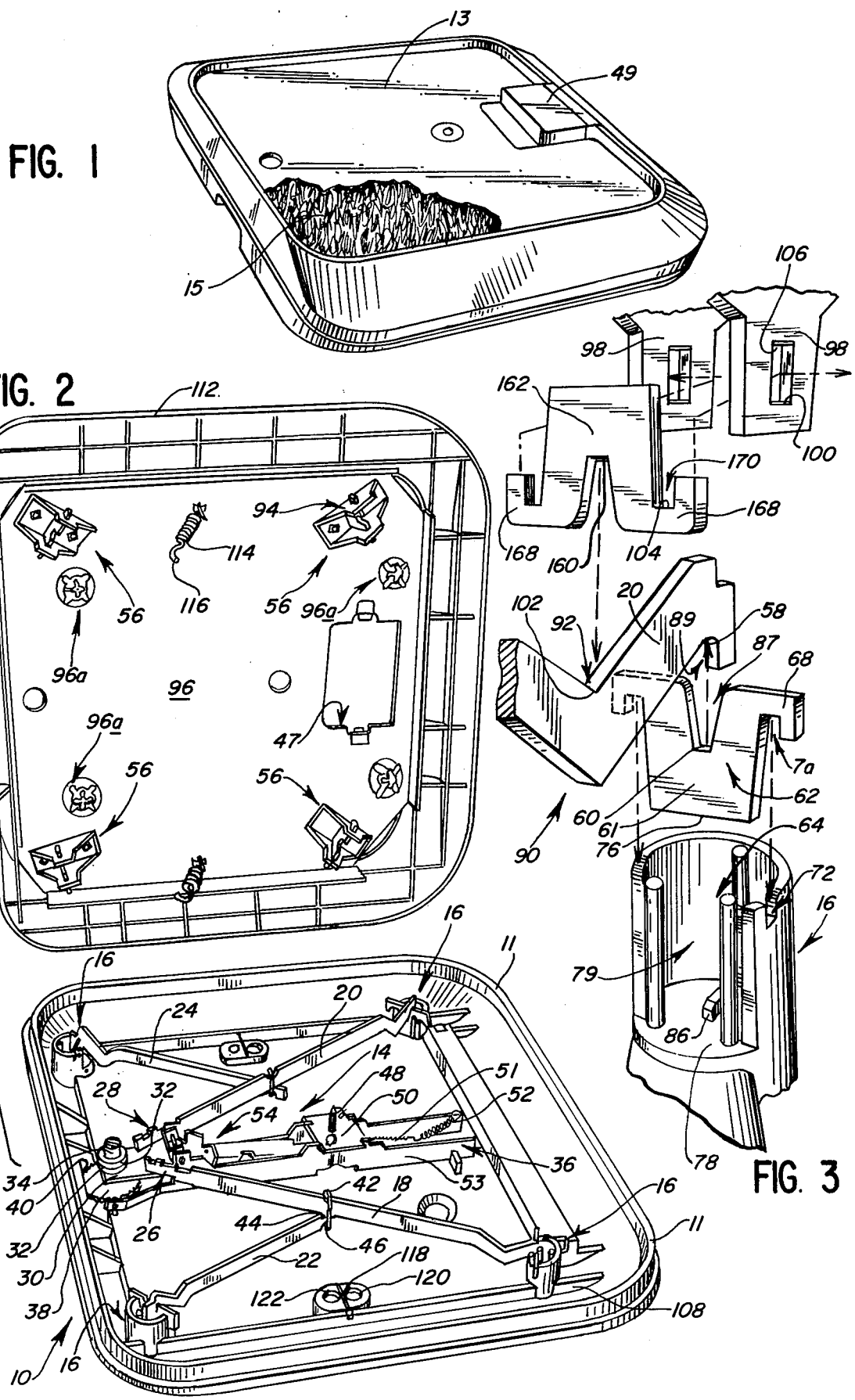

FIG. 4
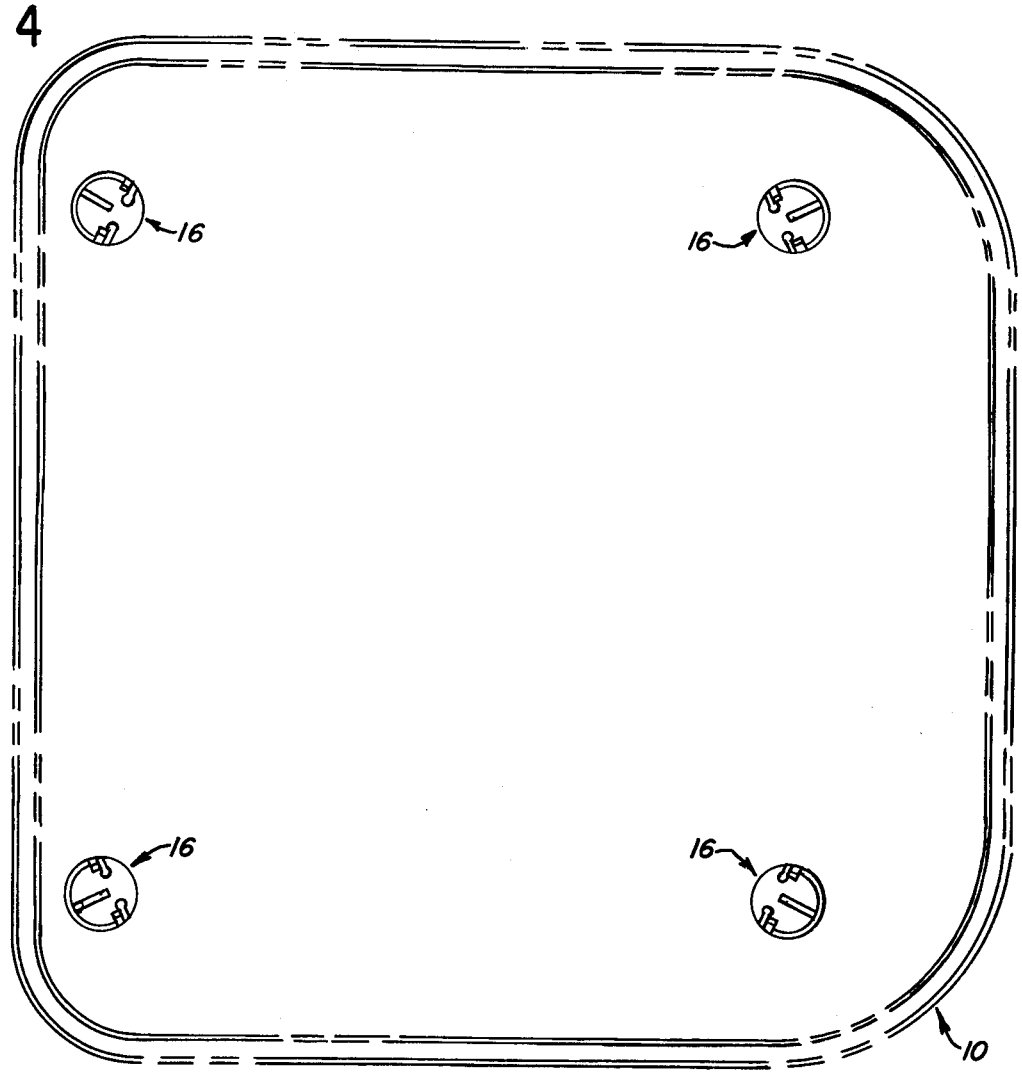
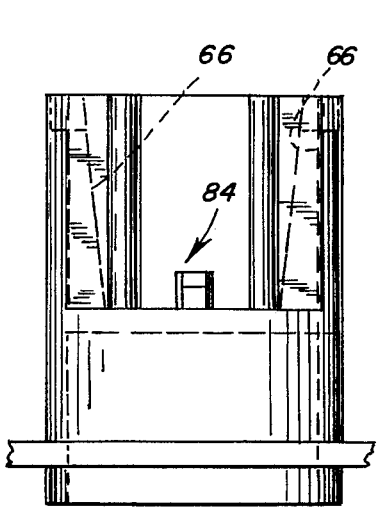
FIG. 5
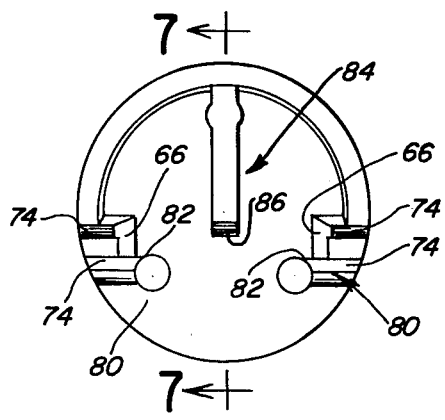
FIG. 6
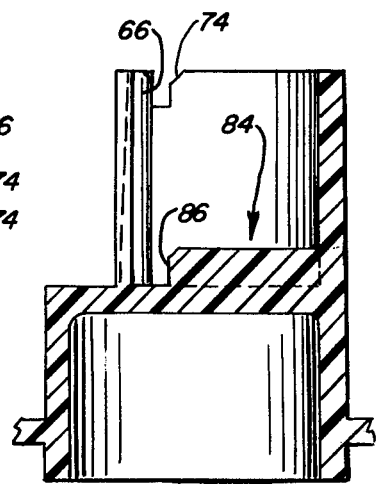
FIG. 7

CORNER POST MOUNT FOR WEIGHING SCALE

BACKGROUND OF THE INVENTION

1. Field of the Invention

This invention relates to a platform scale of the bathroom type and more particularly to a structure for rigidly mounting a metallic knife edge within a plastic base.

2. Description of the Background Art

Heretofore, platform scales have been constructed primarily from light gauge metal. The extra strength that metal affords is desirable in that it minimizes distortion under weights that might exceed 250 pounds, which distortion might otherwise adversely affect the accuracy of the readings.

On the other hand, scales fabricated from metal are more difficult to form, with the metal also representing a substantial increase in weight. Increasing proportionately with weight are shipping and handling costs.

To date, however, the most heavily stressed parts of the scale, to include the base supporting the weight-sensing mechanism, have been constructed primarily from metal so that accuracy would not be compromised.

An additional drawback with the prior art is that the corner posts are otherwise separately fabricated and connected to the base. This adds to the complexity of construction, increasing as well the attendant costs.

The present invention is directed specifically to overcoming these prior problems.

SUMMARY OF THE INVENTION

The invention comprises an improved corner post mount about which the operating levers of a platform-type scale pivot. The corner post comprises an upright member integrally molded with the base and defining a vertically extending opening. Means are provided to rigidly maintain an insert captive within the opening primarily by the frictional forces between the insert and upright member. The insert has a knife edge about which a lever, comprising part of the weight-sensing mechanism, is pivoted.

It is the principal object of the invention to provide a structure for rigidly mounting a metal knife edge within a plastic base.

In a preferred form of the invention, the insert has a flat body with two opposing edges converging toward the bottom of the insert. The edges seat flushly against sloped edges which extend inwardly towards each other from opposite sides of the upright member. The mating edges prevent movement of the insert relative to the upright member in the plane of the insert other than in the vertical direction.

The insert has at least one extension from the body which, in conjunction with the body, defines a downwardly facing opening which receives an upper edge of the wall of the upright member. Preferably, the extension closely surrounds the edge to confine relative movement of the insert and upright member.

Upwardly opening notches are provided in the walls of the upright member to receive the extension. This arrangement prohibits movement of the insert transverse to the plane of the extension as well as within the plane as would be accomplished by an unrecessed extension.

To provide stability transverse to the plane of the insert, in addition to that afforded by the cooperation of the notch and extension, a flat surface is defined in the upright member against which one face of the insert is flushly seated. The opposite face of the insert is maintained against the flat surface by an upright edge defined by a rib integrally formed with the base and facing the flat surface. The insert is captured closely between the flat surface and the edge.

The above-described arrangement cooperatively prohibits movement of the insert relative to the upright member in all directions but the vertical. The arrangement permits the insert to be mounted on the base without the use of tools or separate fasteners. The insert is implanted by vertically extending the same relative to the upright member. The frictional forces between the insert and upright member keep the insert captive within the base.

As a result, the base can be constructed entirely of plastic, and molded as a single piece, with the press-fit metal insert not contributing appreciably to the weight of the scale, however affording a structure that is equally effective as those constructed entirely of metal.

The forces imparted to the insert are distributed over the base so as not to concentrate stresses too severely on the base. The lower edge of the insert abuts the base simultaneously as the extension seats within the base of the notch on the wall of the upright.

BRIEF DESCRIPTION OF THE DRAWING

FIG. 1 is a perspective view of a bathroom platform-type scale;

FIG. 2 is a perspective view of the scale with the cover separated from the base and showing the internal sensing mechanism and a preferred form of the corner post mount of the present invention;

FIG. 3 is an enlarged, fragmentary, exploded, perspective view of one of the corner posts and the arrangement for suspending the cover from the base and imparting a force through the cover member to the weight-sensing mechanism;

FIG. 4 is a top plan view of the base of the scale;

FIG. 5 is an enlarged, fragmentary, elevation view of one of the corner posts taken diagonally of the base;

FIG. 6 is an enlarged, top, fragmentary view of one of the corner posts; and

FIG. 7 is an enlarged, fragmentary sectional view along the line 7—7 of FIG. 6.

DETAILED DESCRIPTION OF THE DRAWING

An exemplary scale construction incorporating a preferred form of the invention, is illustrated in FIGS. 1 and 2, to include generally a substantially rectangular base 10 defining an upstanding peripheral rim 11, an interfitting cover member 12, and internal weight-sensing mechanism 14. The cover 12 has a recessed upper platform 13 within which a piece of carpet 15, or the like, is fit to afford a comfortable surface for the user. The sensing mechanism 14, exclusive of the corner post arrangement 16, is conventional and described in the following paragraphs.

The mechanism 14 coacts with four overlapping stamped levers 18,20,22,24 extending from and pivotable at the four corner posts 16. The longer levers 18,20 extend diagonally from the front posts 16 in a V-configuration, with the rear ends 26,28 rigidly secured to a nose plate 30, suspended from a coil spring 32. The nose plate 30 is substantially horizontally arranged and extends between the vertically spaced turns of the spring 32. The coil spring 32 surrounds and is suspended from the top of an upright post 34. The post 34 is threaded internally at its lower end to receive a rod (not shown) through which the vertical position of the post 34 and, thus, the attached spring 32 and associated lever mechanism are variable to zero the scale with no weight applied to the scale. The lower end of the rod abuts a metal channel 36 and is manipulable through an enlarged thumb nut 38 protruding from an opening 40 in the rear portion of the base 10. The channel is secured to the base 10 as by rivets or the like.

The short levers 22,24 extend from the rear corner posts 16 and overlap the long levers 18,20 at an intermediate position thereon. A closed hanger ring 42 surrounds the long and short levers at their point of intersection. The longer levers 18,20 overlie the shorter levers 22,24 and have an upwardly opening V-shaped notch 44 within which the upper part of ring 42 is retained. A downwardly opening notch 46 on the short levers 22,24 accommodates the lower portion of the ring 42. This arrangement permits a degree of relative lateral shifting between the short levers 22,24 and long levers 18,20, however maintains the same in working relationship.

A dial (not shown) is mounted for rotation with an upright splined shaft 48 and rests upon a horizontal plate 50, spanning the sides 53 of and secured to the channel 36. The dial is visible through an opening 47 in the platform 13 having fit therein a transparent window 49. A pinion gear (not shown) extends from the lower portion of shaft 48, beneath the plate 50, and abuts the bottom of the channel 36. The pinion gear is engageable with a rack 51 which is movable forwardly and rearwardly relative to the base 10. The rack is urged toward the front of the base by a tensioned coil spring 52. A bell crank lever 54 transmits the motion of the longer levers 18,20 to the rack. The upper portion of the bell crank lever 54 is captured and pivotally mounted between the sides 53 of the channel 36. The bottom portion of the lever 54 is pivotally connected with the rack 51, which is tensioned forwardly to effect a counterclockwise torque on the lever 54 in FIG. 2. An upright tab (not shown) on the nose plate 30 abuts the rearward portion of the lever and restrains pivoting. When a weight is applied to the scale, the plate 30 is depressed by the long levers 18,20, allowing pivoting of the bell crank lever 54 to the extent permitted by the tab, which, in turn, moves the rack 51 toward the front, rotating the shaft 48 and engaging dial to align the correct weight at the opening 47.

The construction of the corner posts 16 is wherein the invention primarily resides. The weight is applied to the scale through the cover 12 by four hanger assemblies 56 which coincide with the levers 18,20,22,24 at a point adjacent the corner posts, as described hereafter in detail. The levers (18,20), (22,24) are pivotable respectively adjacent their ends at the forward and rearward portions of the scale on intersecting knife edges 58,60 (Fig.3). The description herein of the cooperative arrangement of the hangers 56, the levers 18,20,22,24, and corner posts 16 is made with respect to a representative corner (FIG. 3) at the front edge of the long lever 20. The other corners are identically arranged.

The corner posts 16 are molded integrally with the base 10 as from a lightweight, durable plastic, such as ABS plastic, and have an upright cylindrical configuration, the details of which are illustrated in FIGS. 3-7. A flat, stamped-metal insert 62 is mounted within the post 16. The post has an upwardly facing opening 64 with two diametrically opposite and sloped edges 66 formed internally of and converging toward the bottom of the post 16. The body 61 of the metal-insert 62 is tapered to seat closely against the edges 66 with the insert fully seated, as in FIG. 2.

Two L-shaped arms 68 extend from the body of the insert 62 as to define, in conjunction with the body 61, downwardly facing openings 70 to receive the wall of the post 16. The arms closely surround the upper edge of the post wall. The post 16 has upwardly opening rectangular notches 72 approximately the thickness of the arms 68 which are received in the notch 72. The upper edges 74 of the post 16 defining the notch 72 are beveled to guide the insert into place. With the insert 62 fully seated within the post 16, the bottom edge 76 of the insert abuts a flat bottom surface 78 at the base of the post 16 simultaneously as the arm 68 abuts the post at the bottom of the notch 72.

To prevent relative shifting movement of the insert 62 and post, transverse to the plane of the insert 62, radially directed retaining walls 80 are formed in the post and define a flat surface 82 against which the insert 62 flushly seats. The region 79 between the walls 80 is unobstructed in the region where the lever 20 intersects when in position. A rib 84 defining an upright edge 86, spaced from and facing the surfaces 82 of the walls 80, is formed on flat surface 78 at the bottom of the post 16. The insert 62 is captured closely between the edge 86 and the walls 80 so that no movement of the body 61 occurs at the lower region of the insert. The close engagement of the arms 68 in the notch prevents relative movement of the insert 62 at the top of the post 16.

The close fit of the body 61 between the edges 66 internally of the post and of the post within the opening 70 between the arms 68 and body 61, prevents relative shifting of the post 16 and insert 62 in the plane of the insert 62. The insert is held captive within the post 16 by the frictional forces at the points of contact, with no additional anchoring means contemplated. The posts are oriented preferably such that the plane of the insert 62 is perpendicular to the length of the lever 20.

Within the insert 62 is an upwardly opening notch 87 with the edge of the insert 62, defining the bottom of the notch 87, serving as the aforementioned knife edge 60. The lever 20 has a corresponding downwardly opening notch 89, with the knife edge 58 horizontally disposed and overlapping the edge 60 transversely to the plane of the insert 62. The lever 20 is offset in the shape of a V at 90, adjacent its front end, thereby forming an upwardly opening V-shaped edge 92, the bottom of which engages the hanger assembly 56 on the cover.

The details of the hanger assembly 56 are shown in FIGS. 2 and 3. All four hangers 56 are identically constructed, and again, the discussion is limited to the hanger 56 interacting at the corner post 16 at the front edge of the long lever 20.

Each hanger 56 has a downwardly opening U-shaped bracket 94 attached to a flat metal plate 96 secured to the underside of the cover 12 as, for example, by plastic rivets 96a. The remainder of the cover is preferably fabricated from a lightweight material, as, for example, plastic, as preferably defines the base 10. A hanger plate 162 resides between the walls 98 of the bracket 94 and is suspended thereby. The plate 162 is identical to the stamped metal insert 62 in the corner post and is arranged in an inverted position from that of the insert 62. The corresponding arms 168 protrude outwardly through rectangular openings 100 in the walls 98 of the bracket 94. The openings 100 are large enough to permit a degree of rotation of the hanger plate 162 such that it will align precisely with the apex 102 of the notch 92. Specifically, the corresponding knife edge 160 seats transversely to and against the lever 20. With weight applied to the cover, the walls 98 of the bracket 94 will fit within the opening 170 in the hanger plate such that the upwardly facing walls 104 of the arm 168 will abut the downwardly facing edges 106 defining the opening 100.

The details of the base 10 and cover 12 do not form a part of the present invention. The illustrated configuration of the base 10 and cover 12 is substantially rectangular. Both the base 10 and cover 12 are ribbed internally at 108 to provide stability as to prevent distortion of the case that might affect the accuracy of the sensing mechanism.

The rim 11 of the base 10 seats internally of a corresponding downturned edge 112 on the cover 12. To maintain the connection of the base 10 and cover 12, a pair of coil springs 114 are attached at one end to the cover. With the base 10 and cover 12 mated, the C-shaped end 116 of each spring 114 is extended about a wall 118, defined between two adjacent apertures 120,122 in the base 10. The hanger assembly is held captive in operative relationship between the cover and corner post.

The foregoing description was made for purposes of clarifying the operation of the invention, with no unnecessary limitations to be derived therefrom. The scope of the invention is to be ascertained from the appended claims.

We claim:

1. In a platform-type scale comprising a base, a plurality of counterbalanced levers supported on the base, a weight-sensing mechanism operatively engaged with and responsive to movement of the levers, a cover mating with and shiftable vertically relative to said base, said cover depressing under an applied weight to pivot the levers, which, in turn, actuate the weight-sensing mechanism to indicate the magnitude of the applied weight, the improvement comprising a corner post mount associated with the base for supporting at least one of said levers for pivoting movement relative to the base, said corner post mount comprising:

an upright member molded integrally with the base from a material that is incapable of defining a knife edge suitable for supporting said levers, said upright member defining a vertically extending opening;

a metal insert having an upwardly facing first knife edge; and means frictionally securing said insert to said upright member and maintaining said insert captive within said opening such that said insert is substantially confined against other than vertical movement relative to said upright member, at least one said lever overlapping said first knife edge and having a second knife edge transversely disposed relative to and supported by said first knife edge as to permit pivoting movement of said lever about said first knife edge.

2. The improved scale of claim 1 wherein said insert is substantially flat and has opposed, downwardly converging edges and said upright member has sloped edges defining said opening, the converging edges of said insert seating flushly against the sloped edges of the upright member with said insert in a fully seated position such that relative movement of the insert relative to the upright member in the plane of the insert is substantially restricted in other than the vertical direction.

3. The improved scale of claim 1 wherein said insert is substantially planar and first and second surfaces are formed by said upright member on opposing sides of said opening, said surfaces facing each other and capturing said insert such that movement of said insert relative to said upright member transverse to the plane of the insert is prohibited.

4. In a platform-type scale comprising a base, a plurality of counterbalanced levers supported on the base, a weight-sensing mechanism operatively engaged with and responsive to movement of the levers, a cover mating with and shiftable vertically relative to said base, said cover depressing under an applied weight to pivot the levers, which, in turn, actuate the weight-sensing mechanism to indicate the magnitude of the applied weight, the improvement comprising a corner post mount associated with the base for supporting at least one of said levers for pivoting movement relative to the base, said corner post mount comprising:

an upright member integrally molded with the base from a material that is incapable of defining a knife edge suitable for supporting said levers, said upright member defining a vertically extending opening;

a metal insert having a body portion with flat, oppositely facing surfaces and defining an upwardly facing first knife edge, said insert positionable within said opening;

an extension from said body portion and defining in conjunction with said body portion a downwardly facing opening which receives a wall of said upright member, said extension closely surrounding the wall of said upright member so as to confine movement of said insert relative to said upright member; and means associated with at least one of either said base or upright member engaging said oppositely facing surfaces of the insert and closely capturing said insert as to prohibit movement of said insert relative to said upright member transverse to the oppositely facing surfaces of the insert, said insert fit within said opening serving as a pivot for at least one said lever, said one lever having a second knife edge transversely disposed relative to and supported by said first knife edge for pivoting movement.

5. The improved scale of claim 4 wherein said insert has a lower edge which abuts the base at the bottom of the vertically extending opening simultaneously as said extension abuts the wall of said upright member such that a downward force applied to said one lever is distributed over the base and wall of the upright member.

6. The improved scale of claim 4 wherein said wall of the upright member has an upwardly opening notch which closely receives the extension such that movement of the extension within the notch is prohibited in all but the vertical direction.

7. The improved scale of claim 4 wherein the wall of the upright member is tapered to guide the extension within the notch as the insert is introduced to the upright member.

8. In a platform-type scale comprising a base, a plurality of counterbalanced levers supported on the base, a weight-sensing mechanism operatively engaged with and responsive to movement of the levers, a cover mating with and shiftable vertically relative to said base, said cover depressing under an applied weight to pivot the levers, which, in turn, actuate the weight-sensing mechanism to indicate the magnitude of the applied weight, the improvement comprising a corner post mount associated with the base for supporting at least one of said levers for pivoting movement relative to the base, said corner post mount comprising:

- a metal insert having a flat body with oppositely facing surfaces defining an upwardly facing first knife edge and having opposed, vertically directed edges converging toward the bottom of the body;
- an upright member molded integrally with said base from material that is incapable of defining a knife edge suitable for supporting said levers, said upright member defining a vertically extending opening to receive said insert;
- opposing sloped edges on said upright member, said sloped edges closely seating said converging edges of the body with the insert in a fully seated position as to confine relative movement of the insert and upright member in the plane of the insert and in other than the vertical direction;
- a pair of spaced, opposing edges associated with at least one of either the base or upright member and engaging said oppositely facing surfaces to prohibit relative movement of said insert and upright member transverse to the plane of the insert; and
- an extension from and in the plane of the body of said insert and defining in conjunction with the body a downwardly facing opening which closely receives an upwardly facing edge on a wall of said upright member, said insert introduced vertically within the upwardly facing opening and frictionally retained captive within said opening as to provide a rigid base for at least one said lever, said one lever having a second knife edge transversely arranged relative to and supported by said first knife edge such that said one lever can pivot about the corner post.

9. The improved scale of claim 8 wherein said upright member has a substantially cylindrically shaped wall and said sloped edges extend radially inwardly towards each other from diametrically opposite areas of said wall.

10. The improved scale of claim 8 wherein said wall is extended radially inwardly from diametrically opposite sides of the wall as to form two flat surfaces residing in a common plane against which one of the flat surfaces of the insert flushly seats and a rib integrally formed with the base defines an edge spaced from and facing the plane of said two flat surfaces, said insert being closely captured between said edge on the rib and the two flat surfaces.

* * * * *